March 26, 1968 R. P. SHIVELY 3,375,502

DYNAMIC MEMORY USING CONTROLLED SEMICONDUCTORS

Filed March 1, 1965

4 Sheets-Sheet 1

INVENTOR.
RICHARD P. SHIVELY

March 26, 1968 R. P. SHIVELY 3,375,502

DYNAMIC MEMORY USING CONTROLLED SEMICONDUCTORS

Filed March 1, 1965 4 Sheets-Sheet 2

INVENTOR.
RICHARD P. SHIVELY

INVENTOR.
RICHARD P. SHIVELY

March 26, 1968 R. P. SHIVELY 3,375,502

DYNAMIC MEMORY USING CONTROLLED SEMICONDUCTORS

Filed March 1, 1965 4 Sheets-Sheet 4

INVENTOR.
RICHARD P. SHIVELY

United States Patent Office 3,375,502

Patented Mar. 26, 1968

3,375,502
DYNAMIC MEMORY USING CONTROLLED SEMICONDUCTORS

Richard P. Shively, Los Angeles, Calif., assignor to Litton Systems, Inc., Beverly Hills, Calif.

Continuation-in-part of application Ser. No. 410,077, Nov. 10, 1964. This application Mar. 1, 1965, Ser. No. 436,002

33 Claims. (Cl. 340—173)

ABSTRACT OF THE DISCLOSURE

A dynamic memory device using semiconductor devices, such as controlled rectifiers, in memory circuits wherein the content of a memory cell is signified by the impedance state of a semiconductor, including destructive or non-destructive readout circuit arrangements.

This is a continuation in part of patent application Ser. No. 410,077, filed Nov. 10, 1964 and now abandoned, by Richard Paul Shively for a "Semiconductor Memory Device."

This invention relates to a semiconductor memory device and, more particularly, to a memory device or element comprising a semiconductor controlled rectifier which may be used in either destructive or non-destructive readout arrangements.

There are many memory elements known in the art. There are also many circuits for arranging a plurality of such memory elements to operate together as memory arrays. As a matter of fact, over the last few years, research has provided quite a number of distinct memory devices. For example, the twistor, the tensor, various Eccles-Jordan flip-flop circuits, ferrite cores, and other elements are now commercially feasible and often used to provide logical memory. For various reasons the known elements are imperfect, and the search for better elements continues. Some of the known elements are too large, others require too much power, others are too slow for particular uses, many elements weigh too much, some elements are incapable of storing a signal which is not destroyed during readout, while others operate only over restricted temperature ranges. Many memory elements require a great deal of peripheral equipment for their effective operation. Others utilize a great amount of power in their operation. Many circuits require a substantial amount of hand labor which substantially raises costs.

Paramount among the above-mentioned problems are those related to the speed of operation, the size and weight of the total memory array, the ability of the element to operate in a non-destructive readout (NDRO) mode, and the ability of the element and array to operate with minimal power dissipation. Probably the most used memory element at present is a square-loop ferrite core. The ferrite core may be made relatively small in size and, with a substantial amount of peripheral equipment, may be caused to store two conditions and to read out the conditions either destructively or non-destructively. The power consumed by memories utilizing such elements is not too great though for best results it should be reduced.

In order to solve the problems relating to weight, size, and power consumption, attempts at integrated circuit memories have been made. So far, no really successful integrated circuit memory utilizing ferrite materials has been constructed. One of the main problems is that ferrite cores are normally hand selected to given characteristics in building a memory array of discrete components, and so far it has been impossible to obtain the appropriate consistent square loop characteristics in batch-fabricated ferrite memory arrays. Other problems have arisen with ferrite core memory arrays (memories), both integrated circuit memories and discrete component memories. For example, such memories are highly vulnerable to stray magnetic fields and must normally be provided with a substantial amount of shielding. As mentioned, the power consumption is not low. For example, a conventional 128 word ferrite core memory, though it requires no power to store a particular bit, utilizes from one-half to one ampere to read each bit and has a total power dissipation of approximately twenty watts. The speed of operation of such cores has been limited in a number of cases to less than desired for operation with state-of-the-art computers and other arrangements utilizing memories.

Thus, to date no memory element or array of elements has satisfied all of the above criteria.

It is therefore, an object of this invention to provide an improved memory element.

Another object of this invention is to provide an improved memory array.

A more particular object of this invention is to reduce the weight and size of memory elements and arrays.

Another object of this invention is to increase the frequency at which memory elements may be operated.

An additional object of this invention is to device a low-cost memory element which may be used for either non-destructive readout storage or destructive readout storage.

Yet another object of this invention is to provide memory devices and arrays utilizing substantially less power than conventional devices and arrays.

An additional object of this invention is to provide memory elements and memory arrays which are substantially invulnerable to stray magnetic fields and are capable of operating over wide ambient temperature ranges.

To this end, there has been devised a new memory element which is capable of operating at quite high frequencies, is capable of either destructive or non-destructive readout, costs little to construct, requires minimal power to operate, operates over wide temperature ranges, is invulnerable to external magnetic fields, and may be easily arranged in arrays without a substantial amount of peripheral equipment required for its operation.

The device or element comprises a semiconductor controlled rectifier. One input signal is provided at the control terminal or gate of the rectifier while another input signal is provided to bias the rectifier. With only one of the two input signals, the device will be placed in the non-conducting condition when the input signal is removed. This, in effect, stores a zero. If both inputs are provided coincidentally, the device remains conducting on removal of the input signals. Biasing means provide holding current upon the removal of the inputs. This causes the device to store a one.

During application of the pair of signals to store a one, the transistor in circuit with the rectifier is operated to provide a low impedance path so that a high-valued latching current will flow. The latching current essentially prepares the silicon controlled rectifier so that it may be held on by only the holding current; in particular embodiments, so long as less than latching current is provided, holding current will not maintain the device in the on state. In order to read a condition of the device, one of the input signals is again applied. If the rectifier is conducting, the conduction is sensed to signify that a one is stored. If the rectifier is not conducting, its condition will signify that a zero is stored.

Of special importance is the facility with which the device may be adapted for use in a memory array. All of the elements may be integrated (prepared in integrated circuit form by a batch process); and the appropriate number of inputs are available for controlling the memory by matrix inputs, e.g., ten inputs in a first sense and ten inputs in a second sense being capable of selecting uniquely any one of one hundred memory elements. Furthermore, the output via the transistor or diode element provides the discrete levels necessary in conventional computer equipment and furnishes sufficient power so that sensing amplifiers and the peripheral equipment associated therewith, normally found in a computer memory arrangement, may be eliminated.

These and other objects and features of the invention will be better understood by reference to the following specific description taken together with the attached drawings in which like elements have been designated in a like manner in all figures.

Figures 1, 2:
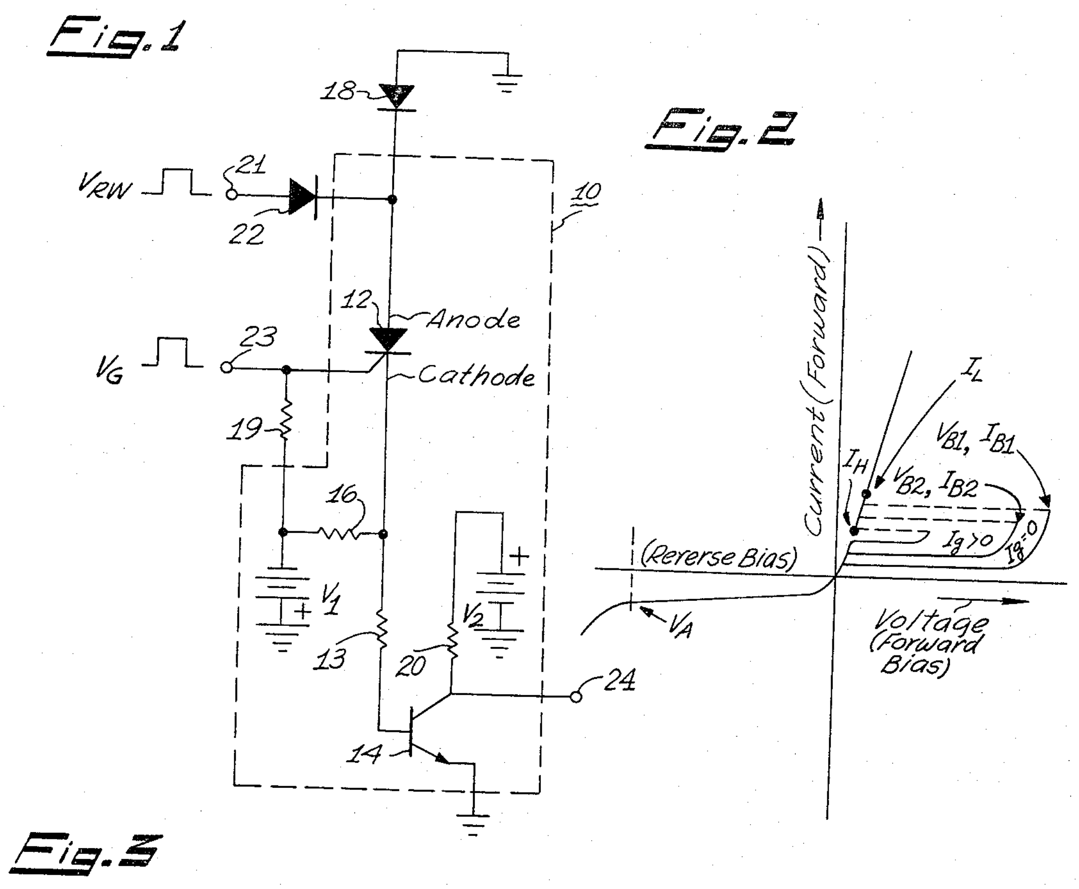
FIGURE 1 is a schematic diagram illustrative of a particular memory element in accordance with the invention.
FIGURE 2 is a current-voltage diagram characteristic of the operation of a semiconductor controlled rectifier, or a pair of PNP and NPN transistors connected as shown in FIGURE 8, useful in explaining the operation of the invention.
Figures 5, 6, 8:
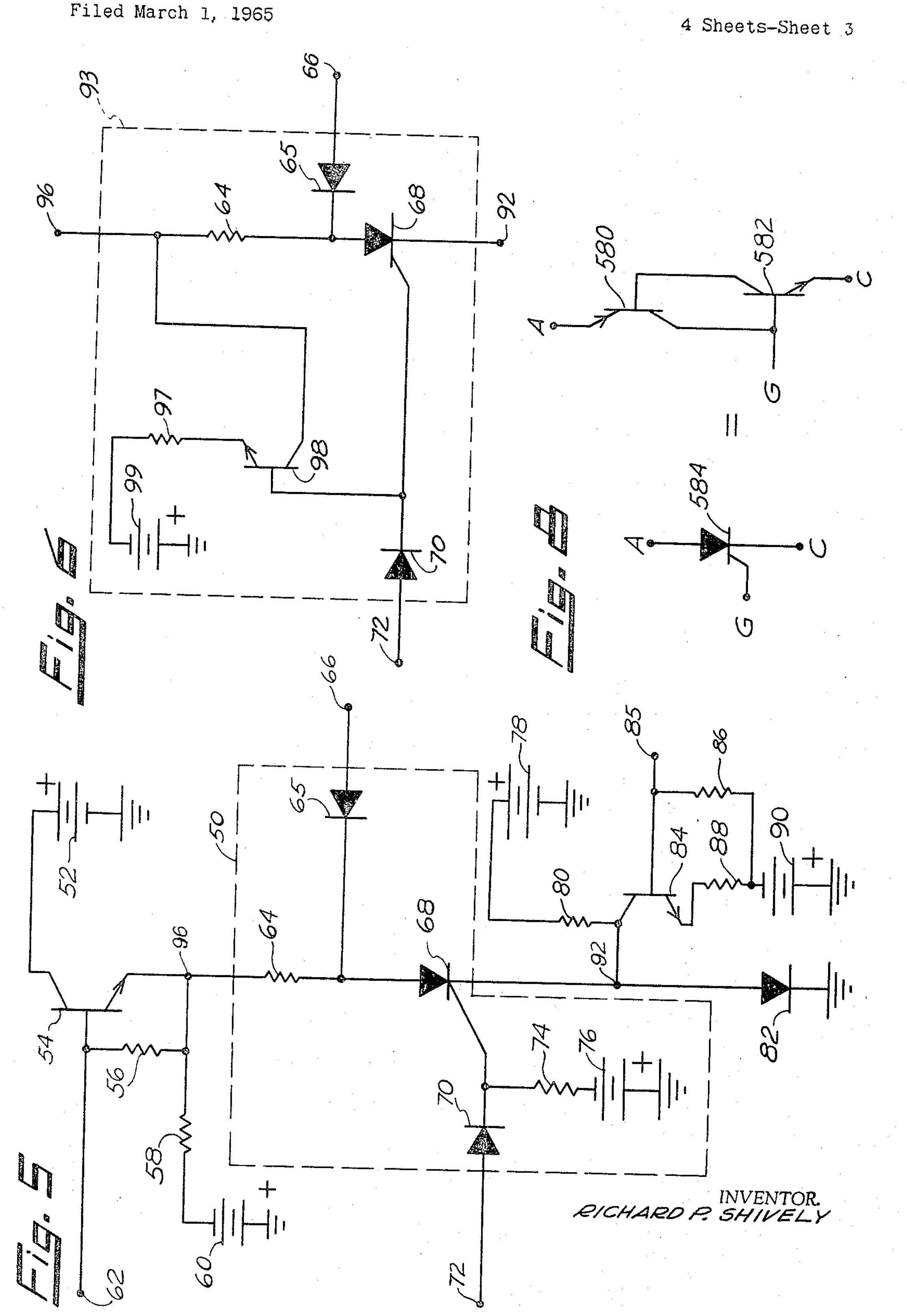
FIGURE 5 is a schematic diagram of an alternative embodiment of a memory element in accordance with the invention.
FIGURE 6 is a modification of the schematic diagram of FIGURE 5.
FIGURE 8 is a schematic diagram showing an equivalent circuit for a silicon controlled rectifier.

In FIGURE 1 of the drawings is illustrated a memory device or element 10 constructed in accordance with the invention. The element 10 comprises a silicon controlled rectifier 12 having an anode, a cathode, and a gating terminal. The rectifier 12 may be chosen from any one of a number of devices well known in the art; a conventional construction for discrete silicon controlled rectifiers are four-layer PNPN structures. Although the four-layer devices are recited herein as silicon controlled rectifiers, it is to be stressed that the device need not be formed of silicon but may be formed of other semiconductor materials such as—for example—germanium. Further, it is contemplated by this invention that four-layer NPNP structures may be fabricated and used in the circuits of this invention with all voltage polarities reversed, all diodes reversed, NPN transistors substituted for PNP transistors, and PNP transistors substituted for NPN tranistors. Further, a well known equivalent circuit for a silicon controlled rectifier is shown in FIGURE 8. Wherever, herein, a silicon controlled rectifier is recited (including the claims), it is intended that the equivalent circuit of FIGURE 8 be included, as well as other semiconductor devices having PNPN and NPNP structures. Essentially, a silicon controlled rectifier is the semiconductor equivalent of a gas thyratron.

Referring to FIGURE 1, the rectifier 12 has its cathode connected by a resistor 13 to the base terminal of a transistor 14. The transistor 14 is a conventional NPN device selected in accordance with criteria outlined in the following description. The anode of the rectifier 12 is connected by conventional diode 18 to ground. The cathode is connected by a resistor 16 to a source of negative biasing potential $V_1$. The gating terminal of the rectifier 12 is connected by a resistor 19 to a source of negative potential. The same source $V_1$ is shown as a matter of component conservation though the actual value of potential applied through the resistor 19 need not be $V_1$.

The transistor 14 has its collector terminal connected to a source of biasing potential $V_2$ by a resistor 20. A terminal 24 is provided for sensing output signals from the element 10. Two input terimnals 21 and 23 are provided for the element 10. The terminal 21 is connected to the anode of the rectifier 12 by a coupling diode 22, while the terminal 23 is connected directly to the gating terminal of the rectifier 12.

Reference to FIGURE 2 should be made in order to understand better the operation of a semiconductor controlled rectifier device such as the rectifier 12. FIGURE 2 illustrates the characteristic curves of the device when various voltages and currents are applied by means of the biasing potentials and the input signals. The curves are intentionally distorted for emphasis. As stated above, the controlled rectifier is the semiconductor equivalent of the gas thyratron. The normal construction of such a rectifier utilizes a PNPN structure with three terminals. Two of these are termed the anode and cathode (as shown in FIGURE 1) while the other is termed a gating terminal. The voltages shown in FIGURE 2 are voltages between the anode and cathode while the currents are those flowing through the device.

In general, the characteristic of the controlled rectifier is such that when back biasing is provided between the anode and cathode only a very small leakage current flows until a point $V_A$ is reached at which an avalanche breakdown is generated. This point $V_A$ is often called the zener, reverse breakdown, or avalanche voltage. In the forward direction of bias between the anode and cathode, one of a number of characteristics may be observed. If no current is applied at the gate terminal, a very low forward current of relatively constant value flows until an avalanche point is reached. This point is illustrated in FIGURE 2 as the point $V_{B1}$, $I_{B1}$. If for the same forward bias a gating current is applied, then a slightly greater but minimal forward current flows through the rectifier until another avalanche point is reached. In general, the small (essentially negligible) forward current will flow in increasing amounts for increasing gating currents for any particular value of forward bias between the anode and cathode.

When the biasing voltage and the gating current are sufficient to cause the device to pass the avalanche point, the voltage across the rectifier drops to a substantially negligible value, as shown by the dashed portion of the curve of FIGURE 2. Thereafter, relative little change in anode-to-cathode voltage will be observed with increasing currents. Actually, the amount of current will depend on the impedance of the circuitry connected to the silicon controlled rectifier. It has been determined that once current through the rectifier is greater than a particular selected latching current (noted as current $I_L$ in FIGURE 2), the input or switching signals applied to energize the rectifier 12 may be removed so long as a lesser-valued holding current is provided. Typically, a holding current of approximately one hundred microamperes will maintain the rectifier in the conducting state. When the rectifier receives less than sufficient input to provide a current greater than the latching current $I_L$, the device will revert to its high impedance state upon removal of input signals and will thereafter conduct only negligible current.

The phenomena by which signals generating current having values greater and less than latching current will cause the rectifier to operate in different states have not as yet been completely investigated. The current technical literature uses the term "overpowering" current. There is some feeling that the point at which latching current flows is not reached until a sufficient voltage buildup occurs at interjunction capacitances within the rectifier device. Another theory is that the controlled rectifier, which is essentially a pair of transistors connected in a feedback arrangement, so functions that a feedback greater than one occurs through multiplication of the independent transistor characteristics at the point where latching current is reached. Neither theory has been proved to the complete satisfaction of scientists; and another theory may, in fact, prove true. The important thing is that a low impedance range exists in which a current equal to the holding value will not in fact maintain high level conduction unless current above the latching level is first applied. This is one of the phenomena utilized in the present memory device.

For whatever reason controls, the device actually operates so that the bias voltage across the rectifier and the input signal applied to the gating terminal may be selected such that neither independently will cause the device to conduct latching current. Thus, neither one of the two determining input signals will independently cause the rectifier to assume the condition at which holding current alone will maintain the condition. On the other hand, the two signals may be selected with values such that their coincident application will cause the device to conduct latching current so that holding current will maintain the device conducting even when the two input signals are removed. These values may be selected from the characteristic curves of FIGURE 2 by choosing a bias voltage, applied to the control electrode, to be less than that which causes the rectifier to switch independently of the gating current, and by choosing a bias voltage, to supply holding current, which is less than that needed to cause latching current when a gating signal is applied.

Additional information relating to the silicon controlled rectifier may be gained from the "RCA Transistor Manual," published in 1964 by Radio Corporation of America, Harrison, N.J.

Referring again to FIGURE 1, if a voltage signal $V_G$ is applied via terminal 23 to the gate of the rectifier 12, the rectifier 12 will conduct in the forward direction. The bias applied to the rectifier 12 will be generated by ground voltage connected through the forward conducting diode 18 to the anode and by negative voltage $V_1$ applied via the resistor 16 to the cathode of rectifier 12. The circuitry supplying signal $V_G$ is selected with appropriate impedance to generate a useful gating current as the rectifier 12 is essentially a current-controlled device. The voltage $V_G$ and current $I_G$ are selected such that with the particular bias the current flowing will be in the region (for the particular values) below the point at which latching current $I_L$ is furnished. Thus, the rectifier 12 will furnish current in the low impedance state through the resistor 16 but that current will be insufficient to cause the cathode to rise to a potential sufficient to turn on the transistor 14. It is possible for the rectifier to operate in either the high or low impedance condition when only signal $V_G$ is applied (depending on the particular value of $V_G$) so long as current less than latching current $I_L$ flows. When the input signal $V_G$ is removed from the terminal 23, rectifier 12 reverts to the high impedance condition.

On the other hand, if a signal $V_{RW}$ is applied to the terminal 21 in the absence of a signal $V_G$ at the terminal 23 and if the signal $V_{RW}$ is less than the value $V_{B1}$ shown in FIGURE 2, the rectifier 12 will remain in the high impedance condition. The removal of he signal $V_{RW}$ will leave the rectifier 12 in the same high impedance condition.

If both signals $V_{RW}$ and $V_G$ are applied coincidently to the terminals 21 and 23, the rectifier 12 is transferred to the low impedance condition in which substantial forward current is flowing, sufficient current that the latching value is surpassed. The attaining of this condition very rapidly is especially facilitated in the circuit of FIGURE 1 by the transistor 14. The simultaneous application of the signals causes a voltage, high enough to trigger transistor 14, to appear at the cathode of the rectifier 12. As the transistor 14 switches to the saturation state, the low impedance path provided allows a high value of current to flow through the rectifier 12. When the signals $V_{RW}$ and $V_G$ are removed, a sufficient amount of current is provided through the diode 18 to maintain the silicon controlled rectifier 12 in the low impedance condition.

Because the base-emitter junction is back-biased, the transistor 14 becomes non-conductive; and no power is drawn during the storage of a "one" by the transistor 14. If a second or "read" signal $V_{RW}$ is provided at the terminal 21 while the rectifier 12 is in the conducting condition, the transistor 14 will be switched again to the on or saturated condition and will provide an output signal of essentially ground level at the terminal 24. On the other hand, as before mentioned, a signal $V_{RW}$ applied at the terminal 21 when the rectifier 12 is in the high impedance condition has no effect on the element 10 or the transistor 14 thereof and the value $V_2$ remains at the terminal 24.

In a particular embodiment in accordance with FIGURE 1 utilizing discrete components, elements of the following values were utilized:

| | | |
|---|---|---|
| Diode **18** | | 1N916 |
| Diode **22** | | 1N916 |
| Rectifier **12** | | 3N81 |
| Transistor **14** | | 2N744 |
| Resistor **13** | ohms | 1000 |
| Resistor **16** | do | 10K |
| Resistor **19** | do | 15K |
| Resistor **20** | do | 4.7K |

In the circuit utilizing the above elements, a signal $V_G$ of between 0.8 and 1.2 volts and a signal $V_{RW}$ of between 2 and 6 volts may be applied. In one particular embodiment, signal $V_G$ was 0.9 volt while signal $V_{RW}$ was 4 volts. In this embodiment, the source voltage $V_1$ was equal to minus two volts while the source voltage $V_2$ was equal to four volts. These levels are sufficiently distinct to provide discrimination in computer circuitry with which the element might be used.

In a particular circuit utilizing the above components, certain things are of particular note. For example, the output signal appearing at the terminal 24 was of either zero or four volts, values which are readily utilized in common computer circuitry without the need of sensing amplifiers. Thus, the device in effect provides its own amplification. Furthermore, the holding current provided from ground through the diode 18 for maintaining the rectifier 12 in the conducting condition was equal to one hundred milliamperes.

It should be noted that the element 10 may be operated in a non-destructive or destructive readout mode. If the same signal $V_{RW}$ is used for reading and writing at terminal 21, then the bit read will remain stored within the element 10. Another advantage of the element 10 shown in FIGURE 1 is that it will operate in the destructive readout mode at quite high speeds, switching from zero to a one state and back at rates above one megacycle with commercial discrete components. In the nondestructive mode, rates of ten megacycles have been attained.

Alternatively, the circuit of diode 18 may be opened, either by a switch (not shown) or by substituting a transistor for diode 18, to open the holding current path.

Most important, however, is the ease with which the components of the element 10 may be prepared in integrated circuit form. By conventional state of the art processes, all of the diodes, resistors, the transistor, and the silicon controlled rectifier may be prepared on a single chip. The ability to integrate is enhanced by the noncritical nature of the components of the memory element. Such a device is easily prepared with integrated circuit interconnections as a part of a memory array on a single chip of semiconductor material. The advantages of the integrated form are manifest. For example, in an integrated circuit matrix comprising 128 words, each of twentyfour bits, the total operating power requirement is approximately five watts whereas the power requirement for a like size ferrite core memory is about twenty watts. The foregoing is true even though the ferrite cores require no power for storing a zero or a one. This results because the switching power required for a ferrite memory is substantially higher than that necessary for the elements of the present invention and because the power required for storing a one condition in an element of this invention is so minimal.

An integrated circuit matrix in accordance with this invention is approximately one-third the size of conventional core memory arrays and may even be 1/100 the size. It is also substantially lighter than such arrays. Furthermore, the device is insensitive to magnetic fields which have a vary adverse effect on ferrite core devices. As research continues on the device in accordance with this invention, it is contemplated that even higher switching speeds will be attained because of the ability to minimize the cross-sectional area of the junctions of the various components in integrated circuit arrangements.

When provided in integrated circuit form no hand labor is required; thus the cost of the device is materially reduced. With the low power requirements above-mentioned, minimal size supply sources such as cadmium batteries are quite feasible. The device has also been found to be substantially insensitive to temperature variations. For example, normal operating conditions may vary from −55° centigrade to +125° centigrade.

The use as memory elements herein disclosed should be contrasted with the conventional use of silicon controlled rectifiers. First, the memory element here disclosed utilizes the dual phenomena of holding and latching currents ot accomplish its useful results which are especially adaptable to computer matrix form. Silicon controlled rectifier circuits normally do not selectively distinguish between the two current values in their operation and are normally used as switches. Moreover, the present memory provides output signals at the necessary logic levels with sufficient power for use without sensing amplifiers. A conventional silicon controlled rectifier circuit does not offer this capability nor do conventional memory elements. Other distinctions will be readily apparent to those skilled in the art.

Figure 3:
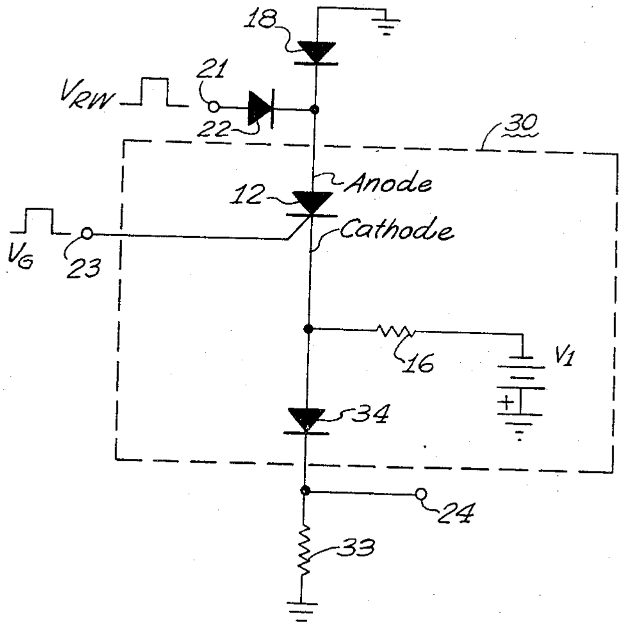
FIGURE 3 is a schematic diagram of another memory element constructed in accordance with the invention.

In FIGURE 3 is shown another memory element constructed in accordance with the invention. As with the element disclosed in FIGURE 1, a silicon controlled rectifier 12 is connected in circuit with means for making use of its peculiar latching versus holding current characteristics. More particularly, a silicon controlled rectifier 12 has its anode connected to ground through a diode 18 and its cathode connected to a source of negative potential $V_1$ through a resistor 16. Input signals are provided at the anode of the rectifier 12 from a terminal 21 through a diode 22. Gating input signals are provided to the gating terminal of the rectifier 12 from a terminal 23. The cathode of the rectifier 12 is also connected by a diode 34 to a resistor 33 leading serially to ground. An output terminal 24 is connected at the cathode of the diode 34.

As with the element 10 shown in FIGURE 1, the element 30 of FIGURE 3 is biased so that an input signal $V_{RW}$ applied at the terminal 21 is insufficient of itself to cause conduction of a high current through the rectifier 12. Furthermore, a signal $V_G$ at the input terminal 23 will be insufficient to cause the rectifier 12 to pass latching current $I_L$ in the forward direction without the application of the input signal $V_{RW}$ coincidentally. It should be noted that when the signal at terminal 23 is applied, a high valued current less than latching current $I_L$ may flow in the rectifier 12; however, due to the biasing values, the cathode of the rectifier 12 will remain below ground so that the diode 34 will remain back-biased. When both signals $V_{RW}$ and $V_G$ are applied coincidentially to terminals 21 and 23, the silicon controlled rectifier 12 will be placed in its high conductance state. More particularly, as the signal $V_G$ is applied and causes the rectifier 12 to switch to its low impedance state, the voltage signal $V_{RW}$ applied at terminal 21 will raise the voltage at the cathode of the rectifier 12, forward biasing the diode 34 and providing a low impedance path to ground through the resistor 33. This allows sufficient current to flow through the rectifier 12 to latch the device. Upon the removal of the input signals at terminals 21 and 23, the current provided through the diode 18 will be sufficient to hold the rectifier 12 in the conducting condition. It should be noted that the diode 34 will revert to the non-conducting condition due to the reduction in the potential at the cathode of the rectifier 12.

When the signal $V_{RW}$ is thereafter applied to read the condition of the element 30, a non-conducting rectifier 12 will remain non-conducting; and the signal $V_{RW}$ will have no effect on the condition of the terminal 24 (i.e., ground will be applied since diode 34 is non-conducting). On the other hand, if the rectifier 12 is conducting (storing a one), then the signal $V_{RW}$ will vary the bias at the cathode of the rectifier 12 sufficiently to cause the diode 34 to conduct in the forward direction and initiate a positive output voltage at the terminal 24. Thus, the operation of the element 30 shown in FIGURE 3 is substantially like that of the element 10 shown in FIGURE 1. Again, essentially the same advantages accrue. Most important, however, is the fact that all of the components of the element 30 also are readily constructed in integrated circuit form.

Figure 4:
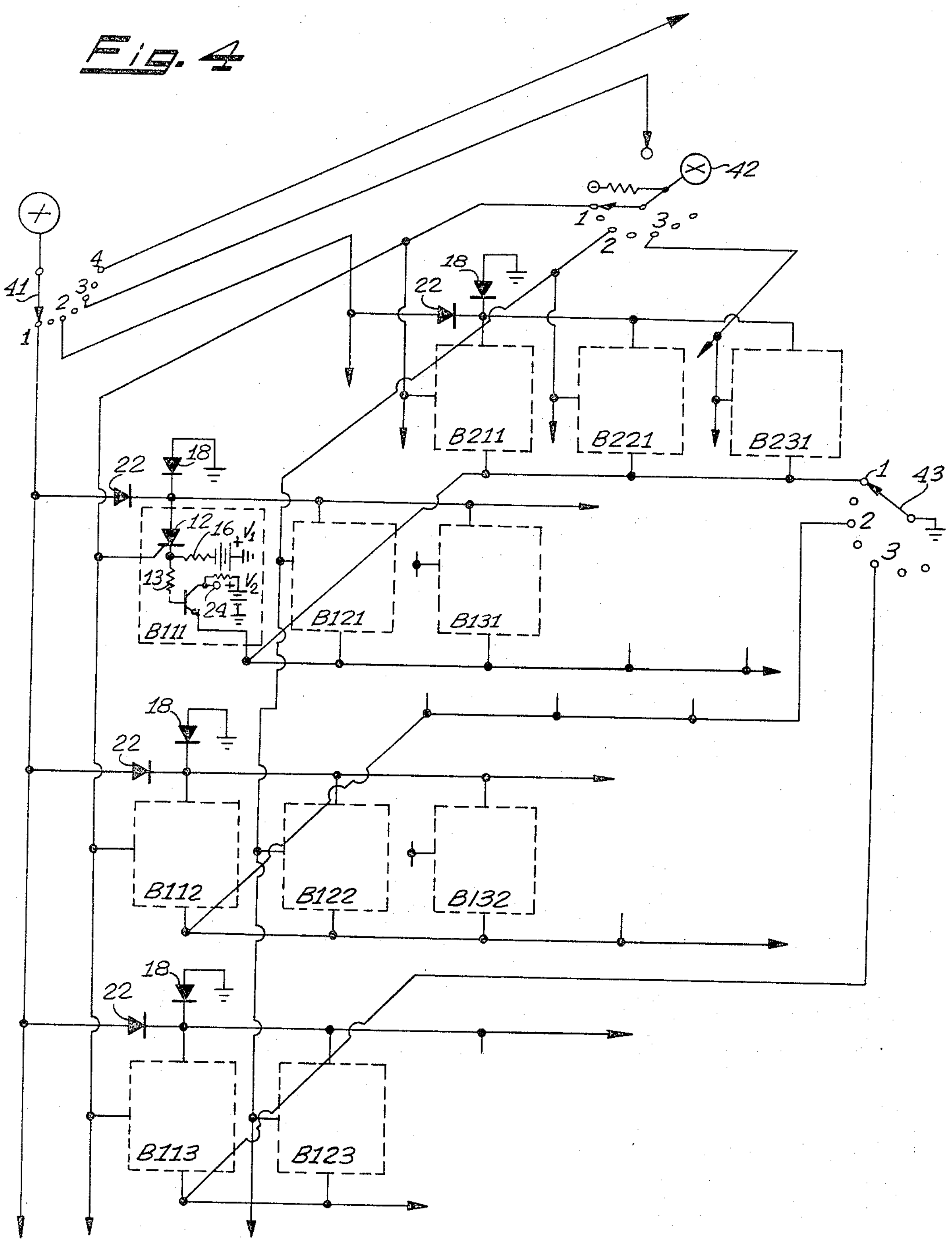
FIGURE 4 is a schematic diagram of a memory array constructed in accordance with the invention utilizing the memory element shown in FIGURE 1.

In FIGURE 4 is shown a memory array comprising a number of memory devices or elements constructed in accordance with the invention. The schematic diagram in FIGURE 4 is believed to be useful in visualizing the facility with which the memory elements may be placed in an array and addressed for both write and read in a most economical fashion. More particularly, the portion of the memory element shown within the dotted lines in FIGURE 1 is included within each of the dotted line sections illustrated in FIGURE 4. However, only one memory element is actually shown in order to relieve the confusion possible were all shown. Each dotted section is labelled as a particular bit of storage, e.g., $B_{111}$.

The gating terminals of each rectifier 12 are connected to a multiple switch 42. The anode of each rectifier 12 is connected, through a diode 22, to a multiple switch 41 while the emitter of the transistor 14 of each element is connected to a multiple switch 43. Each switch position of the multiple switch 41 provides input to the anode of each rectifier 12 of an element lying in one particular plane parallel to the surface of the sheet of FIGURE 4. Thus when the switch 41 is positioned at any one of the four illustrated positions (more may obviously be used), the elements lying in the plane nearest the viewer are all furnished a positive voltage via the switch 41. In a like manner, each of the switch positions of the switch 42 provides positive potential to the gating terminals of the rectifiers 12 of the elements lying in a particular plane; and each position of the switch 43 provides ground at the emitters of all transistors 14 of the elements lying in a particular plane. Thus, by placing each of the switches 41, 42, and 43 in a particular position, a one may be written in a single selected bit. In like manner, a zero may be placed in particular positions by an energization of only two or one of the terminals connected to a particular bit. For example, if the switch 41 is in the position one, the switch 42 is in the position one, and the switch 43 is in the position one, then the bit labelled $B_{111}$ will be selected and driven to the high conductance condition to store a one. On the other hand, if the switch 42 is moved to the two position and the other switches remain in identical positions, then the bit $B_{121}$ will be selected. It will be noted that designation of each memory element (e.g., $B_{111}$) depends on the position first of the switch 41, then of the switch 42, and finally of the switch 43. Quite obviously, the switches 41, 42, and 43 are used only for the purpose of illustration and would be replaced in a particular arrangement by circuit well known to those in the art. For example, transistor gating and selection means would normally be used for applying signals to the terminals designated 1, 2, 3, and 4 of each of the switches.

A special facility of the system is the arrangement whereby a complete word (for example the word including bits $B_{111}$, $B_{121}$, $B_{131}$, . . . $B_{1N1}$) may be read by energizing only the switches 41 and 43. For example, the switches 41 and 43 may each be placed at the one position. The switch 42 would be moved to one of the positions where no input signal is provided. In this condition, the output terminal 24 of each of the elements in the selected word would be sampled to provide parallel readout in the particular word. Furthermore, as will be quite obvious to those skilled in the art, the matrix arrangement shown provides for selection of any individual bit by the provision of only three distinct input signals at three distinct terminals. Thus, the peripheral circuitry associated with the arrangement is substantially reduced. This reduction of peripheral circuitry is further enhanced by the utilization of the output signals of the transistors 14 of each element whereby two useful logic levels are obtained without the necessity of normal sensing amplifier stages. Thus, the entire memory array shown in FIGURE 4 could be easily placed on a single chip in an integrated circuit arrangement without the necessity of externally connected components other than input and sensing components. The selection means used for the array might conceivably be placed on the same chip so long as maintained in either transistor or diode form to further enhance the value of the arrangement.

Referring to FIGURE 5, an alternative embodiment of the storage element 50 is shown connected to peripheral equipment. In the storage element 50, a silicon controlled rectifier 68 is connected by its anode to one terminal of a resistor 64 and to the cathode of a diode 65. The control electrode of controlled rectifier 68 is connected to the cathode of diode 70 and to one terminal of a resistor 74. The second terminal of resistor 74 is connected to the negative terminal of an electrical energy source 76 which, in turn, is connected to a common or ground terminal. Terminal 72, connected to the anode of diode 70, is adapted to receive switching signals for causing the element 50 to store a binary "1" bit of information. The terminal 66, connected to the anode of diode 65, is adapted to deliver information concerning the state of memory element 50.

The second terminal of resistor 64 is typically connected in series with the collector-emitter path of a transistor 54 to the positive terminal of an energy source 52 and to the negative terminal of an energy source 60 through a series resistor 58. The negative terminal of source 52 and the positive terminal of source 60 are connected to a common or ground terminal. The resistor 56 is connected between the base and emitter of transistor 54 to provide a base current path. Terminal 62, connected to the base of transistor 54 is adapted to receive signals which open or close the collector-emitter circuit of transistor 54.

The cathode of controlled rectifier 68 is typically connected in series with the collector-emitter path of a transistor 84 and a resistor 88 to the negative terminal of a source of electrical energy 90. The cathode of controlled rectifier 68 is also typically connected through a resistor 80 to the positive terminal of a source of electrical energy 78 and to the anode of a diode 82. The cathode of diode 82, the positive terminal of energy source 90, and the negative terminal of energy source 78 are connected to a common or ground terminal.

The memory circuit 93 of FIGURE 6 is similar to the circuit 50 of FIGURE 5 except that the base-emitter path of a transistor 98 has been connected in series between the control electrode of controlled rectifier 68 and a resistor 97. The collector of transistor 98 is connected to terminal 96. Resistor 97 is connected to the negative terminal of an energy source 99 whose positive terminal is connected to a common or ground terminal. The resistance of resistor 74 of FIGURE 5 is typically ten or more times the value of the resistance of resistor 97 of FIGURE 6. Consequently, the circuit of FIGURE 6 is more easily fabricated in monolithic form.

To describe the operation of the devices of FIGURES 5 and 6, assume that the controlled rectifier 68 is initially in its "0" or high impedance state wherein the flow of anode-cathode current is negligible. Assuming that transistor 54 has the proper operating potentials upon it (i.e., a positive base with respect to the emitter), the terminal 96 has a positive potential. The terminal 72 usually has a negative voltage applied until a control signal is received. Terminals 66 and 92 are usually about one diode drop above the ground or common potential. When a "1" is to be written into the element 50, terminal 72 is switched from a minus voltage to a ground voltage which causes current to flow through diode 70. If a potential is applied to terminal 85 (a positive base to emitter voltage) to cause the collector-emitter path of transistor 84 to conduct, the cathode of controlled rectifier 68 is given a minus potential at the same time that a current flows through diode 70 to cause control electrode current to flow in controlled rectifier 68 to initiate anode-cathode current of rectifier 68. Thus, when terminal 92 is switched to a minus voltage in coincidence with the switching of terminal 72 to a ground voltage, anode-cathode current starts to flow in rectifier 68 to switch the controlled rectifier to its low impedance or "1" state. The rectifier 68 continues to have an anode-cathode current flow even after transistor 84 ceases to conduct and the ground potential is removed from terminal 72, the current flow being through diode 82.

To read out the information that has been stored in a given element 50 or 93, terminal 92 is switched from ground voltage (or substantially ground voltage) to a minus voltage by applying a signal to terminal 85 causing transistor 84 to conduct. If a "1" is stored in the controlled rectifier 68, in a typical circuit the voltage at terminal 66 will change from approximately 0.7 volt above ground to approximately 1 volt below ground potential. If a "0" is stored in the controlled rectifier, no change occurs in the potential at terminal 66. The read operation is non-destructive in nature.

To change the stored information from a "1" to a "0," a relatively negative voltage is applied to terminal 62 which opens the collector-emitter path of transistor 54 causing the anode of rectifier 68 to be placed at a negative potential by the energy source 60. Holding current no longer flows into the controlled rectifier 68 and the controlled rectifier returns to its high impedance state.

The bias source 78 not only supplies current to the collector of transistor 84 but also supplies current to diode 82 to keep diode 82 conducting. Thus, diode 82 conducts except when transistor 84 conducts.

In FIGURE 5 the energy source 76 biases the control electrode of rectifier 68 to a negative potential during periods of non-conduction of diode 70 and supplies a negative voltage to cathode or diode 70 so that a ground potential applied to the anode of diode 70 causes diode 70 to conduct. The resistance of resistor 74 may be, for example, of the order of 10,000 ohms to limit the flow of control electrode current during conduction of rectifier 68.

In the device of FIGURE 6, resistor 97 may be of the order of 1,000 ohms which, because of the amplifying features of transistor 98, reflects back into the circuit of diode 70 and the control electrode of rectifier 68 an impedance of the order of 10,000 ohms.

Figure 7:
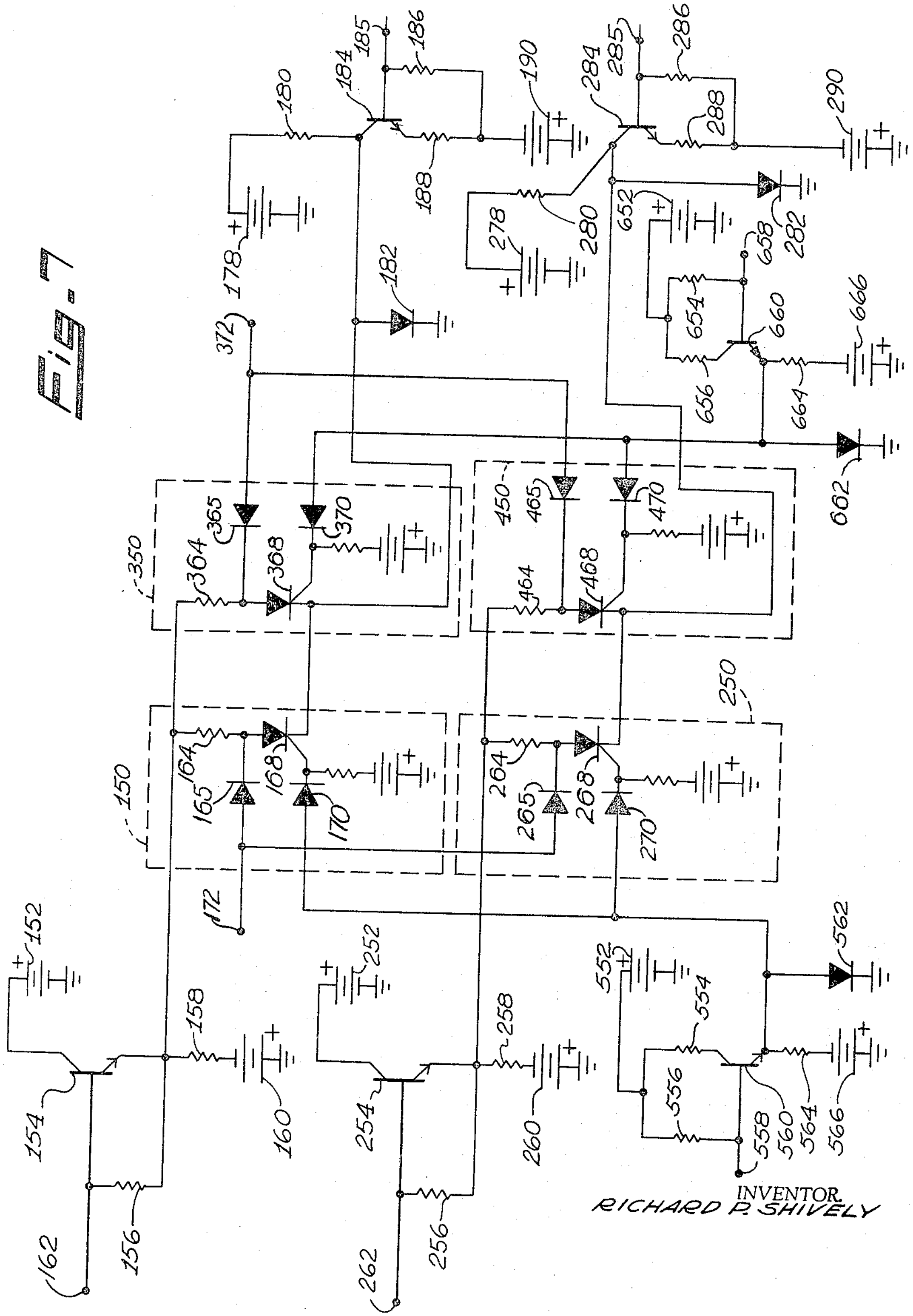
FIGURE 7 is a schematic diagram of a memory array constructed in accordance with the invention utilizing the memory element shown in FIGURE 5.

The circuit of FIGURE 7 is a two-word, 2-bit-per-word memory system with its associated electronics. It is to be noted that the electronics is identical to that of FIGURE 5 except that a plurality of electronics is shown.

The circuit with elements 152 through 162, and the circuit with elements 252 through 262 are identical with the circuit of FIGURE 5 containing elements 52 through 60. The circuits 150, 250, 350 and 450 are identical with the circuit 50 of FIGURE 5. The circuit with elements 178 through 190 and the circuit with elements 278 through 290 are identical with the circuit containing elements 78 through 90 of FIGURE 5.

The circuit containing elements 552 through 566 is a driver circuit for driving the control electrodes of elements 150 and 250. The circuit containing elements 652 through 666 is identical to the circuit containing elements 552 through 566, and is connected to drive the control electrodes of elements 350 and 450. The transistor 560 is connected through a biasing resistor 554 to the positive terminal of an electrical energy source 552 whose negative terminal is connected to the ground or common terminal. The positive terminal of source 552 is connected through a biasing resistor 556 to the base of transistor 560. The emitter of transistor 560 is connected through a load resistor 564 to the negative terminal of a source of electrical energy 566. A diode 562 is connected by its anode to the emitter of transistor 560. The positive terminal of energy source 566 and the cathode of diode 562 are connected to the ground or common terminal. The emitter of transistor 560 is connected to the anodes of diodes 170 and 270. The emitter of transistor 660 is connected to the anodes of diodes 370 and 470.

The emitter of transistor 154 is connected through resistor 164 to the anode of controlled rectifier 168 and through resistor 364 to the anode of controlled rectifier 368.

The emitter of transistor 254 is connected through resistor 264 to the anode of controlled rectifier 268 and through resistor 464 to the anode of controlled rectifier 468.

The collector of transistor 184 is connected to the cathode of controlled rectifiers 168 and 368.

The collector of transistor 284 is connected to the cathodes of controlled rectifiers 268 and 468.

Assume that storage elements 150 and 350 correspond, respectively to bits one and two of word one. Assume also that storage elements 250 and 450 correspond, respectively, to bits one and two of word two.

To describe the operation of FIGURE 7, assume that all storage elements are initially in their high impedance or "0" state. To write a "1" into bit one of word one, and leave bit two of word one in a "0" state, a potential is applied to terminal 558 causing transistor 560 to conduct and simultaneously a potential is applied to terminal 185 causing transistor 184 to conduct. The cathodes of controlled rectifiers 168 and 368 are placed at a negative potential while the control electrodes of controlled rectifiers 168 and 268 are placed at a ground potential by the flow of current through diode 562. Transistor 154 is normally conducting in the absence of a control signal on terminal 162 whereby the anodes of controlled rectifiers 168 and 368 are placed in a relatively positive potential. Thus, the potentials and currents applied to controlled rectifier 168 are proper to cause the anode-cathode current to flow, setting memory cell 150 into a "1" condition. In a similar fashion, any of the other memory elements such as elements 250, 350 or 450 could be set into a "1" condition.

To reset the memory element 150, a signal is applied to terminal 162 opening transistor 154 and causing the negative voltage of source 160 to be applied to the anodes of controlled rectifiers 168 and 368. Thus, the circuit of transistor 154 is a word reset. Similarly, the circuit of transistor 254 is a word reset. The circuits of transistors 184 and 284 are word sets, and the circuits of transistors 560 and 660 are bit sets. To set a bit it is necessary that a word set and a bit set circuit be energized.

To read out the bits of a word at terminals 172 and 372, the word set circuit of transistor 184 is energized. To read out the bits of the second word at terminals 172 and 372, the word set circuit of transistor 284 is energized.

The equivalent circuit of a silicon controlled rectifier 584 is shown in FIGURE 8. The equivalent circuit comprises a pair of transistors 580 and 582 in which the collector of one transistor is connected to the base of the other transistor and in which the anode of the controlled rectifier 584 corresponds to the emitter of a first transistor 580 and the cathode of the controlled rectifier 584 corresponds to the emitter of the second transistor 582 with the control electrode corresponding to the base of the second transistor 582. This configuration of equivalent circuits shown in FIGURE 8 is well known in the art and, it is intended, shall be included in the concepts and structure of a controlled rectifier as described and claimed herein.

Thus, the memory element of this invention comprises a semiconductor thyratron, such as a controlled rectifier, a silicon controlled rectifier, or the transistor circuit of FIGURE 8, each having an anode terminal, a cathode terminal, and a control terminal. Such devices are shown in circuit at 12 and 68. An electrical energy means is connected to the anode terminal and the cathode terminal, biasing the thyratron toward a current-conducting state. Such electrical energy means is shown at $V_1$ and at 52 and 90. A second electrical biasing means is connected to the control terminal to bias the thyratron toward a non-conducting state. The second electrical biasing means is shown at $V_1$ in combination with resistor 19 of FIGURE 1. It may be connected to terminal 23 of FIGURE 3 if desired. A second biasing means is also formed by elements 74 and 76 of FIGURE 5, and by elements 99, 97 and 98 of FIGURE 6. A means such as that shown in elements 552 through 566 of FIGURE 7 may be used to inhibit the operation of the second biasing means, to apply voltages and currents of a polarity and direction to the control terminal to cause the thyratron to conduct. A second biasing means, such as that shown in elements 54 through 62 of FIGURE 5 may be used to inhibit the operation of the first biasing means to prevent the flow of current in the anode to cathode circuit of the thyratron. A means for selectively sensing the presence or absence of current flow in the anode to current path of the thyratron is supplied by transistor 14 and terminal 24, and by the circuit associated with transistor 84, diode 65, and terminal 66.

Thus, the device of this invention is a relatively inexpensive circuit element which easily may be made with integrated circuits, and the like, in a relatively inexpensive manner to provide a compact, reliable, and lightweight memory element or package of elements for a computer.

Although the device has been described in detail above, the invention shall not be limited to that description but only in accordance with the spirit and scope of the appended claims.

I claim:

1. In combination:

a semiconductor thyratron having an anode terminal, a cathode terminal, and a control terminal;

first electrical biasing means, biasing to less than latching current value, connected in the anode-cathode current path, biasing said thyratron toward a holding current-conducting value;

second electrical biasing means, connected to said control terminal to bias said thyratron toward a non-conducting state;

first inhibiting means for inhibiting the operation of said second biasing means, to apply voltages and currents of a polarity and direction selectively to said control terminal to cause said thyratron to conduct;

means for enhancing said first electrical biasing means to produce latching current;

second inhibiting means, selectively connected to said first electrical biasing means to inhibit the operation of said first biasing means to stop the flow of current in the anode to cathode circuit of said thyratron; and means for selectively sensing the presence or absence of current flow in the anode to cathode current path of said thyratron.

2. A device as recited in claim 1 in which said thyratron is a silicon controlled rectifier.

3. A device as recited in claim 2 in which said first biasing means comprises an electrical energy source, and said second inhibiting means for said first biasing means is a transistor, with the collector-emitter path connected in series with said energy source and with said anode-cathode current path, and third biasing means connected to oppose the operation of said first biasing means when said transistor is not conducting.

4. A device as recited in claim 3 in which said second biasing means comprises a voltage source connected to said control terminal, and in which said first inhibiting means comprises a control voltage source, connected in series with a semiconductor device to said control terminal.

5. A device as recited in claim 4 in which said means for sensing the flow of anode-cathode current comprises means for selectively modifying the magnitude of the flow of anode-cathode current, and means connected to said anode-cathode circuit to sense changes in voltage caused by said modification.

6. A device as recited in claim 1 in which said thyratron comprises:

- a first transistor;
- a second transistor, of complementary type to said first transistor, with its collector connected to the base of said first transistor and its base connected to the collector of said first transistor, the base of said second tranistor being the control terminal of said transistor and the anode-cathode current path being through the emitters of said transistors.

7. A device as recited in claim 6 in which said first biasing means is selected to provide just sufficient current for maintaining said thyratron conducting once latching current is flowing.

8. A device as recited in claim 7 including means for selectively disconnecting said second biasing means.

9. A device as recited in claim 2 and which further includes an arrangement for enhancing the switching speed of a dual-input silicon controlled rectifier circuit comprising biasing means providing a high impedance for current through said rectifier, a device having at least two controllable impedance states, and means for switching said device to its low impedance state in response to the coincident application of both inputs to said rectifier.

10. In combination:

- a controlled rectifier having anode, cathode, and control terminals;
- a resistor connected by one terminal to said anode;
- a second resistor connected by one terminal to said control terminal;
- a first diode connected by its cathode to said anode;
- a second diode connected by its cathode to said control terminal;
- a first electrical energy source and a first switching means, connected in series with the second terminal of said first resistor;
- first biasing means for biasing said controlled rectifier into non-conduction, when said switching means is open;
- second biasing means, connected to the second terminal of said second resistor to bias said controlled rectifier into non-conduction;
- a diode, connected to the cathode of said rectifier and to a common voltage connection to maintain the flow of anode-cathode current of said rectifier; and
- a third electrical energy source, connected in series with a second switching means to the cathode of said controlled rectifier to modify the magnitude of anode-cathode current of said rectifier.

11. In combination:

- a pair of complementary transistors, connected with the collector of a first one of said transistors to the base of the second said transistor, and with the collector of the second said transistor to the base of the first said transistor;
- a resistor connected by one terminal to the emitter of said first transistor;
- a second resistor connected by one terminal to the base of said second transistor;
- a first diode connected by its cathode to the emitter of said first transistor;
- a second diode connected by its cathode to the base of said second transistor;
- a first electrical energy source and a first switching means, connected in series with the second terminal of said first resistor;
- means for biasing said complementary transistors into non-conduction, when said first switching means is open;
- biasing means, connected to the second terminal of said second resistor to bias said complementary transistors into non-conduction;
- a diode, connected to the emitter of said second transistor and to a common voltage connection to maintain the flow of current through said complementary transistors; and
- a third electrical energy source, connected in series with a second switching means to the emitter of said second transistor to modify the magnitude of current through said complementary transistors.

12. A memory element comprising a semiconductor controlled rectifier having an anode, a cathode, and a gating terminal; a transistor; means for biasing said transistor to the non-conducting condition; means for biasing said rectifier, said biasing means including means for furnishing holding current to the rectifier during its low impedance condition; means for supplying an input signal at the gating terminal insufficient to generate latching current through said rectifier; means for supplying an input signal at the anode insufficient to generate latching current through said rectifier except in the presence of a signal at the gating terminal; and means for operating said transistor in the low impedance condition in response to the signal at the anode terminal when said rectifier is in the low impedance condition.

13. A memory device comprising a controlled rectifier having an anode terminal, a cathode terminal, and a gating terminal; a NPN transistor having an emitter terminal, a cathode terminal, and a base terminal coupled to the cathode terminal of said rectifier; first means for biasing said rectifier in the non-conductive state; second means including said first means for biasing said transistor in the non-conducting state; means for applying coincident input signals at the anode and gating terminals of said rectifier sufficient together to cause sufficient current to flow through said rectifier to cause said transistor to conduct and provide a low impedance path for latching current through said rectifier.

14. A memory device as in claim 13 in which said first biasing means is selected to provide just sufficient current for maintaining said rectifier conducting once latching current is flowing.

15. A memory device as in claim 13 including means for selectively disconnecting said second biasing means.

16. A memory arrangement comprising a semiconductor device having high and low conduction states of operation, the high conduction state being initiated by a first high current value after which a lesser current will maintain such state; a first means connected to said device for providing input thereto; a second means connected to said device for providing input thereto; and an output means having high and low impedance path for current therethrough upon coincident energization of said first and second input means, a high impedance path for current therethrough when either of said first or second means is energized independently and said device is initially in the low conduction state, and a low impedance path for current therethrough when said first input means is energized independently and said device is initially in the high conduction state.

17. A memory device as recited in claim 16 in which said device comprises a silicon controlled rectifier, and said output means comprises a saturable semiconductor device.

18. A memory cell comprising a semiconductor controlled rectifier having anode, gating, and cathode terminals; a first diode having a cathode terminal connected to the anode terminal of said rectifier and having an anode terminal connected to a first potential level; a second diode having a cathode terminal connected to the anode terminal of said rectifier and having an anode terminal connected to a source of input signals having a potential value greater than said first potential level; a first resistor connected to the cathode of said rectifier and to a second potential level lower than said first level; a device having high and low impedance state; a second resistor connected in series with said device between the cathode of said rectifier and a third potential level; means for furnishing input signals having a potential level greater than said first potential level to the gating terminal of said rectifier; and means for deriving output signals from said device.

19. A memory cell as recited in claim 18 wherein said device includes an NPN transistor.

20. A memory cell as recited in claim 18 wherein said device includes a semiconductor diode.

21. In combination:

a controlled rectifier having anode, cathode, and control terminals;

a first electrical energy source and a first switching means, connected in series with the anode-cathode current path of said rectifier;

first biasing means connected to said anode-cathode current path to bias said controlled rectifier into non-conduction, when said switching means is open;

second biasing means, connected to said control terminal to bias said controlled rectifier into non-conduction;

semiconductor means, connected into said anode-cathode current path to maintain the flow of anode-cathode holding current of said rectifier; and voltage modifying means, connected in series with a second switching means into said anode-cathode current path to modify the magnitude of anode-cathode current of said rectifier.

22. A device as recited in claim 21 and further comprising at least one resistor, connected into said anode-cathode current path, across which signals indicative of current flow appear.

23. A device as recited in claim 21 and further comprising second and third semiconductor means, connected into said anode-cathode current path and said control electrode path, respectively, and adapted to receive control signals.

24. A device as recited in claim 23 and further comprising:

at least one resistor connected in said anode-cathode current path; and means for sensing voltage drops across said resistor.

25. A device as recited in claim 21 in which said second electrical biasing means comprises:

a forward biased transistor having its base connected to said control terminal.

26. A device as recited in claim 25 and further comprising:

a current limiting resistor in the collector-emitter path of said last named transistor.

27. In combination:

a controlled rectifier having anode, cathode, and control electrodes;

a voltage source, of magnitude to bias the anode-cathode current path of said rectifier toward its holding current value; and forward-biased semiconductor means, connected into said anode-cathode current path and adapted to be controlled to modify the anode-cathode voltage of said rectifier into its latching-current value upon receipt of a control signal.

28. A device as recited in claim 27 and further comprising:

a forward-biased semiconductor device connected into the anode-cathode current path of said rectifier;

means for biasing said control electrode to a voltage to prevent conduction of said rectifier; and means for applying signals to said control electrode and said anode-cathode current path to cause said rectifier to conduct.

29. In combination:

a controlled rectifier having anode, cathode, and control electrodes;

a first voltage source, in series with a first resistor, connected into the anode-cathode current path of said rectifier to bias said rectifier toward a holding current value;

a first semiconductor device, connected into said anode-cathode current path to complete the anode-cathode circuit;

second biasing means connected to bias said control electrode into a condition of nonconduction of said rectifier;

second semiconductor means connected to modify the anode-cathode voltage of said rectifier; and a forward biased third semiconductor device connected to be controlled in response to the state of conduction of said anode-cathode current path.

30. A device as recited in claim 29 in which said last named semiconductor device comprises a forward biased transistor having its control terminal connected to a resistor in said anode-cathode current path to receive signals indicative of the flow of current through said anode-cathode current path.

31. A device as recited in claim 29 in which said last named semiconductor device comprises a diode in series with a resistor.

32. In combination:

a controlled rectifier having anode, cathode, control electrodes;

a first resistor connected by one terminal to the anode of said controlled rectifier;

a first diode connected by its cathode to the anode of said controlled rectifier;

a second diode connected by its cathode to the control electrode of said controlled rectifier;

a control electrode biasing source, in series with a second resistor, connected to said control electrode;

a first transistor;

a second voltage source tending to forward bias said transistor;

a third voltage source tending to backward bias said transistor;

the emitter of said transistor being connected to the second terminal of said first resistor;

the base of said transistor being adapted to receive a control signal of a polarity and amplitude to cause the collector-emitter path of said transistor to cease conducting;

a fourth diode, connected by its anode to the cathode of said rectifier and by its cathode to a common terminal;

a second transistor having its collector forward biased from a fourth voltage source in series with a resistor, and having its emitter back biased from a fifth voltage source in series with a resistor, said fifth voltage source also being connected through an additional resistor to the base of said last named transistor, the base of said last named transistor being adapted to receive signals to cause said last named transistor to conduct and to modify the anode-cathode voltage relations of said rectifier.

33. A device as recited in claim 32 in which said biasing means for said control electrode comprises a forward biased transistor, including a current limiting resistor in the collector-emitter path thereof, and in which the base electrode of said last named transistor is connected to the control electrode of said rectifier.

References Cited

UNITED STATES PATENTS

| | | | |
|---|---|---|---|
| 2,709,042 | 5/1955 | Couffignal | 340—173 X |
| 2,840,702 | 6/1958 | Branch | 340—173 X |
| 3,282,632 | 11/1966 | Arsem | 307—88.5 |
| 3,132,264 | 5/1964 | Dahme | 340—173 X |
| 3,204,127 | 8/1965 | Meier | 340—173 X |
| 3,217,176 | 11/1965 | Chin | 307—88.5 |
| 3,267,288 | 8/1966 | Maiden et al. | 307—88.5 |
| 3,304,441 | 2/1967 | Pelt | 307—88.5 |

BERNARD KONICK, *Primary Examiner.*

J. F. BREIMAYER, *Assistant Examiner.*